Dec. 20, 1966

A. B. McKAIG 3,293,630

TRANSISTORIZED MONITORING CIRCUIT

Filed July 19, 1963

INVENTOR.
ARTHUR B. McKAIG

BY *Smith & Mattern*

ATTORNEYS

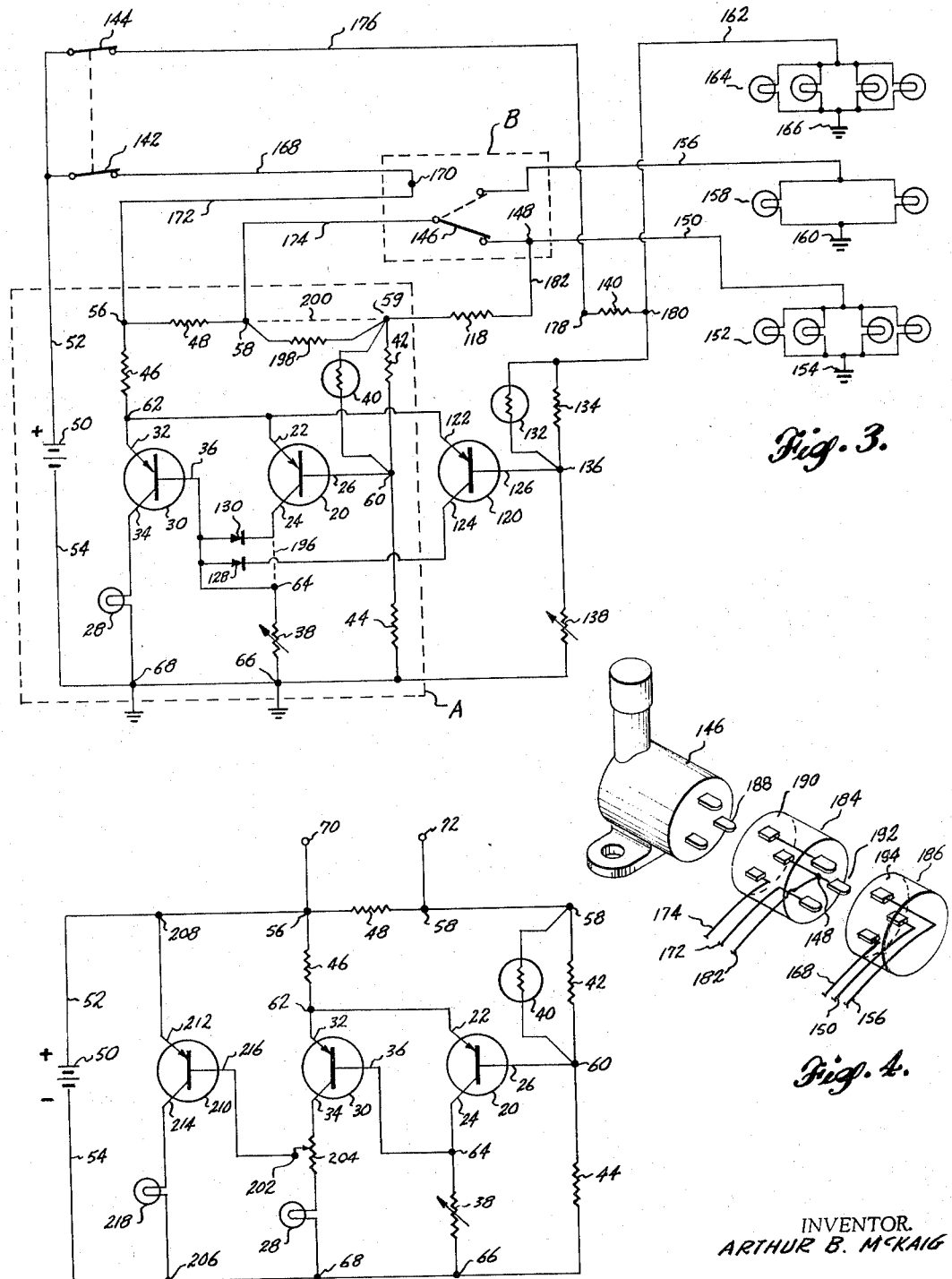

United States Patent Office 3,293,630
Patented Dec. 20, 1966

3,293,630
TRANSISTORIZED MONITORING CIRCUIT
Arthur B. McKaig, 9848 NE. 33rd,
Bellevue, Wash. 98004
Filed July 19, 1963, Ser. No. 296,166
3 Claims. (Cl. 340—248)

This invention relates to electrical circuits and more particularly to interrelated circuits wherein at least one circuit monitors changes of current or voltage in another circuit. The monitoring circuit, in whole or in part, may serve to initiate signals, switches, lights and/or relays.

The purpose of the invention is to provide electronic equipment which will monitor changes of current or voltage in a principal circuit or circuits of either direct or alternating current electrical energy distribution systems, selectively indicating when a monitored current or voltage exceeds or falls below predetermined limits and, as necessary, initiating the operation of various types of visible and/or audible signals and/or various kinds of remedial apparatus.

The invention, briefly described, in its simplified embodiment is a monitoring circuit, comprising: as necessary, conventional wires; connectors; resistors; thermistors; semiconductors, and a reference voltage source so arranged with respect to semiconductors, to include at least two transistors for detection and power functions. After an interrelated connection of this monitoring circuit, to a principal circuit, if a predetermined critical limit of a monitored principal circuit current flow or voltage potential is reached or passed, such faulty operation of the principal circuit will be detected. The deviation in current flow or voltage potential sufficiently changes a biasing voltage between the base and emitter of one transistor, serving as a detector transistor, resulting in either increasing or decreasing current through this detector transistor but never stopping its current flow. This current change thereby causes another biasing voltage between the base and emitter of a second transistor, serving as a power transistor, to change, controlling its current flow accordingly from no flow to full flow. Then in series with this on, off current flow through the latter power transistor, there are alarms, signals and corrective sensing equipment optionally connected to indicate and possibly remedy faulty operation of the principal circuit.

The monitoring circuit requires only a small percentage of principal circuit energy for its precise analysis. Also its repeated operations occur upon minimum increments of change, up or down, about the predetermined limit in voltage potential or current flow being monitored. Therefore, this monitoring circuit, optionally provided with temperature adjusting elements and other compensators, is utilized in conjunction with many circuits, as suggested by the illustrations, wherein like numerals refer to like components, in the drawings where:

FIBURE 3 is a schematic diagram showing base circuit (A) of an overall monitoring circuit and its additional circuit components to be connected together to monitor current flow through headlight and taillight circuits of a vehicle;

FIGURE 4 is a perspective view of electro-mechanical connections made between a headlight current monitoring circuit and a vehicle headlight electrical system at the high to low beam floor switch, as indicated in the circuit except within dotted line block (B) of FIGURE 3; and FIGURE 5 is a schematic diagram showing another base circuit to be connected to an overall monitoring circuit with additional circuit components, as necessary, to monitor current or voltage deviations, presenting signals to indicate the direction of such changes with respect to a predetermined value.

Figure 1:
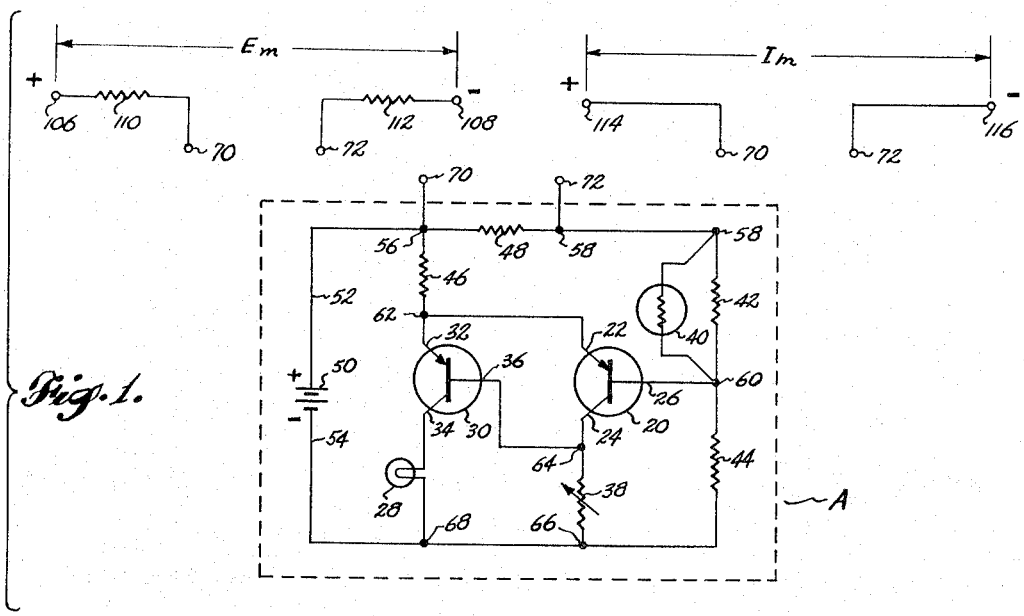
FIGURE 1 is a schematic diagram showing base circuit (A) of an overall monitoring circuit and its additional circuit components to be connected together alternately to monitor either direct current (right) or voltage (left)
Figure 2:
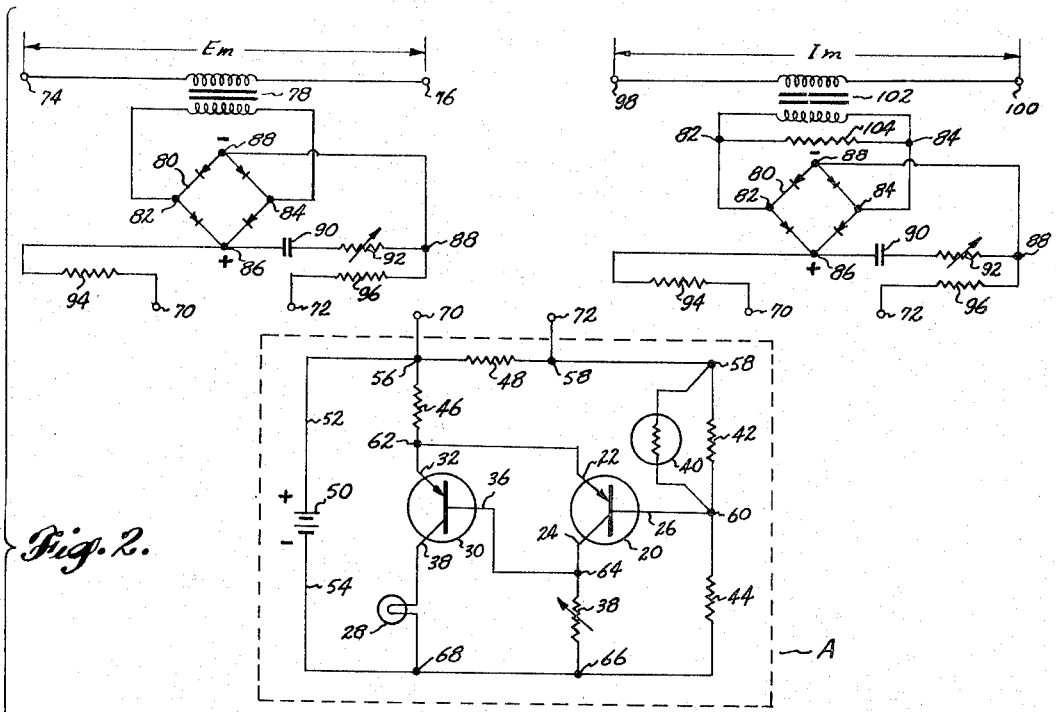
FIGURE 2 is a schematic diagram showing base circuit (A) of an overall monitoring circuit and its additional circuit components to be connected together alternately to monitor either alternating current (right) or voltage (left)

Throughout the various applications of the invention and especially as noted throughout these accompanying drawings, there is employed a primary or base monitoring circuit within various overall monitoring circuits. In FIGURES 1 and 2, the base or primary monitoring circuit embodiment is noted within a dotted line enclosure (A). In FIGURE 3, a modified primary or base circuit embodiment is noted with respect to the original dotted line enclosure (A) and in FIGURE 5, the entire figure represents another embodiment of a primary base circuit.

Wherever this primary or base monitoring circuit is used in overall monitoring circuits, it comprises interrelated functioning detector and power transistors, a constant reference direct current voltage source, and, as necessary, temperature compensators and adjustable resistors.

Direct current circuit monitoring

Throughout FIGURES 1 and 2, the primary or base monitoring circuit (A) is substantially similar in arrangement and operation within an overall monitoring circuit connected to a principal circuit. In FIGURE 1, the overall monitoring circuit is connected to a direct current principal circuit, whereas in FIGURE 2, it is connected to an alternating current principal circuit.

In FIGURE 1, if a direct current voltage is to be monitored, additional monitoring circuit components on the upper left of the FIGURE 1, such as resistors 110 and 112, are included, respectively, between terminals 106, 70 and terminals 108, 72. Or if a direct current is to be monitored, additional components on the upper right of FIGURE 1, such as the electrical leads, as may be necessary, are included, respectively, between terminals 114, 70 and terminals 116, 72.

With respect to either monitoring objective, whether it be surveillance of direct current or voltage, the primary or base monitoring circuit (A) internal operations are essentially the same. With specific reference to the monitoring or surveillance of the voltage, as noted in FIGURE 1, left side, the base circuit (A), indicated within the dotted lines, and its so called overall monitoring circuit are connected to the principal circuit (not shown) at points, terminals or connectors 106, 108. The principal circuit voltage $E_m$ is applied at positive terminal 106 and negative terminal 108 and between these terminals and the base circuit (A) terminals 70, 72, resistors 110 and 112 of the additional circuit components are included in series in this overall monitoring circuit. By inclusion of such resistors 110 and 112, only a small portion of the total voltage of the principal circuit occurs across terminals 70, 72 and likewise across resistor 48 between its terminals 56, 58.

In circuit (A) an isolated constant reference voltage power supply, such as a battery 50, is connected on the positive side to wire 52 and on the negative side to wire 54. Thereafter, during normal principal circuit operation and upon continuance of this reference voltage energy, the normal specified voltage across resistor 48 is the result of a small principal circuit current flowing between points 106 and 108, and of monitoring circuit current flowing from battery 50 through wire 52 to point 56, through selected resistor 48 to point 58, through resistor 42 and thermistor 40 to point 60, through resistor 44 to point 68 and through wire 54 back to battery 50. The latter monitoring circuit current also develops a voltage between points 58 and 60, which adds to the voltage across selected resistor 48 between points 56 and 58. Overlooking the function of resistor 46 for the moment, a bias voltage $E_{eb}$ results between points 62 and 60 which are connected to the emitter 22 and base 26 respectively of detector transistor 20. This normal bias voltage results in current flow from battery 50 through wire 52 to point 56 through resistor 46 to point 62 through the emitter 22 and collector 24 of detector transistor 20 to point 64 through adjustable resistor 38 to point 66 and back through wire 54 to battery 50. The flow of current through adjustable resistor 38 raises the potential of point 64 sufficiently close to the potential of point 62 that the bias voltage $E_{eb}$ between points 62 and 64, which are connected to the emitter 32 and base 36 respectively of power or output transistor 30, will not permit current to flow from the emitter 32 to the collector 34 of power transistor 30 and on to a signal lamp 28 or alarm (not shown) and back to battery 50. Thus a normal voltage above a predetermined or set point, appearing across resistor 48, will not cause or permit a signal lamp 28 to light.

However, should the principal circuit voltage being monitored fall off, reducing the drop in potential between points 106 and 108, the voltage drop across resistor 48 will be reduced proportionately. This reduces bias voltage $E_{eb}$ between points 62 and 60 associated with the detector transistor 20, which in turn reduces the current flowing from point 56 to point 62 through the emitter 22 and collector 24 of detector transistor 20 on to point 64 and through adjustable resistor 38. Such change in current flow lowers the potential of point 64 with respect to point 62, thus increasing the bias voltage $E_{eb}$, between the emitter 32 and base 36 of power transistor 30. Upon increase in its bias voltage $E_{eb}$, transistor 30 conducts current flow from point 62 to its emitter 32, and out its collector 34 to a signal lamp 28 or alarm (not shown) on to point 68 and back to battery 50. Thus a reduction in voltage across selected resistor 48 below a predetermined point will cause the signal lamp 28 to light and remain lighted until the principal circuit voltage being monitored returns to normal.

When the monitoring circuit is connected to monitor current $I_m$ in a direct current circuit, the operation of the invention is almost identical to that just described. The only difference is that the current to be monitored is connected with positive at point 114 and negative at point 116. Resistor 48 is, as before, in series with the current flow to be measured, making the invention sensitive to current changes rather than voltage changes. Selected resistor 48 would normally be chosen to give a voltage drop of less than 1 volt.

*Temperature change compensation in monitoring circuits*

In FIGURE 1, whether or nor primary or basic monitoring circuit is eventually connected in an overall monitoring circuit to surveil principal circuit direct current or voltage, the environment in which it operates will in most installations necessitate the inclusion of temperature change compensation components. Such components and their immediate circuits in one embodiment comprise the thermistor 40 with is associated shunt resistor 42 and a series resistor 44. Their components reappear in substantially like-circuit arrangement throughout all the drawing figures and cooperate substantially as indicated now in conjunction with monitoring a principal direct current circuit.

The thermistor 40 with its shunt resistor 42 and associated series resistor 44 provides temperature compensation especially for the detector transistor 20 and power transistor 30. In addition the thermistor 40 provides sufficient additional compensation for the balance of the monitoring circuit components. Such compensation is needed where none or insufficient environmental control is provided about the circuits and components. At higher temperatures less bias voltage $E_{eb}$ between points 62 and 60 is required to enable the detector transistor 20 to keep the signal light 28 off during normal operation. The resistance of thermistor 40 decreases with a rise in temperature; this reduces the voltage drop between points 58 and 60, thus reducing the total bias voltage $E_{eb}$ for detector transistor 20. Conversely, at lower temperatures a greater bias voltage $E_{eb}$ between points 62 and 60 is required to enable the detector transistor 20 to function normally. The resistance of thermistor 40 increases at lower temperatures, providing a greater voltage drop between points 58 and 60, thus increasing the total bias voltage $E_{eb}$, for detector transistor 20. Shunt resistor 42 and series resistor 44 are chosen to closely match the temperature correction characteristics of thermistor 40 with these temperature compensation requirements of both transistors 20 and 30.

*Decisive changeover of monitoring circuit indicating status*

In most monitoring circuits, a decisive indication of improper performance of any principal circuit is preferably sought. Resistor 46, whose function was previously and intentionally not described, is included in all the embodiments of the primary or base monitoring circuits to insure that a snap or otherwise quick changeover indicating action will occur in the power transistor 30 circuit. Where a signal lamp 28 is relied upon as a visual indicator, the lamp is either completely on or off without having any broad operating range near a predetermined value of monitored voltages or currents. Its normal operation is best described by assuming that first a normal voltage drop is across resistor 48, second, a bias voltage $E_{eb}$ between points 62 and 60 is sufficiently large to cause detector transistor 20 to conduct between its emitter 22 and its collector 24 and third, a signal lamp 28 is out because power transistor 30 is not conducting. Thereafter, if the voltage across selected resistor 48 is reduced to the level that the bias voltage $E_{eb}$ between points 62 and 60 for detector transistor 20 is low enough to reduce the current slightly from point 62 through transistor 20, its emitter 22 and its collector 24, to point 64 through adjustable resistor 38 to point 66 and back to battery 50, then the potential of point 64 will be lowered slightly which in turn slightly increases bias voltage $E_{eb}$ between points 62 and 64 which are at the emitter 32 and base 36 of power transistor 30. This causes the power transistor 30 momentarily to start to conduct a small amount of current which must flow from point 56 through decisive resistor 46 to point 62 through power transistor 30, its emitter 32 and collector 34, and on through signal lamp 28. When this condition occurs, immediately and simultaneously an additional voltage drop appears across decisive resistor 46, thereby causing a further decrease in bias voltage $E_{eb}$ between points 62 and 60 at the emitter 22 and base 26 of detector transistor 20. This decrease occurs since the potential of point 62 is lowered toward that of point 60 by the amount of the voltage drop across resistor 46. This lowering potential change is very significant and the circuit is designed so the maximum current through power transistor 30 is in one embodiment approximately 10 times the current which passes through detector transistor 20. Reducing this bias voltage $E_{eb}$ for detector transistor 20 further reduces the current through detector transistor 20, its emitter 22 and collector 24, and through adjustable resistor 38 to battery 50. This reduced current flow is responsible for continuing to lower the potential of point 64 and causing more current to flow through decisive resistor 46, on through power transistor 30 and through signal lamp 28 or alarm (not shown). This monitoring circuit responsive action is self-sustaining and instantaneous, continuing until maximum current is flowing through signal lamp 28 and at all times current continues to flow through collector 24 of detector transistor 20.

Upon an increase in voltage across resistor selective 48, a similar but reverse action takes place until current no longer flows through signal lamp 28. It will be observed that a very minute change in voltage across selective resistor 48, at the predetermined and chosen operating level of the monitoring circuit will light or extinguish a signal lamp 28 or other indicator or remedial components, depending on whether the voltage decreases or increases.

Calibration of monitoring circuit

As indicated, apart from temperature compensation, other calibration of the monitoring circuit in each of its various embodiments or applications is possible. In the initial design considerations all circuit components are interrelated and some major adjustments are possible by using different sized or rated selective resistors 48 and decisive resistors 46. However, once a monitoring circuit is in its specific operating or closely related reasonably specific operating environment, on the spot calibration either to change operating levels or to overcome manufacturing tolerances in various components such as resistors, transistors and thermistors is undertaken by convenient adjustment of a matching resistor 38, as indicated by its inclusion in the embodiments of the base monitoring circuits throughout FIGURES 1, 2, 3, and 5. Although not shown, the selective resistor 48 might also be adjustable like the matching resistor 38 thereby avoiding possible frequent replacement of selective resistor 48 when the monitoring circuit was periodically connected to other principal circuits.

Alternating current circuit monitoring

In FIGURE 2, an embodiment of a base monitoring circuit (A) is arranged to be connected at points 70 and 72 to additional overall monitoring circuit components to monitor either alternating current $I_m$, or voltage $E_m$ of a principal circuit (not shown). The voltage $E_m$ of the principal circuit to be monitored is applied to terminals, connectors or points 74 and 76 connected to the primary winding of a potential transformer 78. The secondary winding of this potential transformer 78 is connected to a full wave rectifier 80 at points 82 and 84 and the voltage across these points 82 and 84 is proportional to the voltage $E_m$ to be monitored. Rectifier 80 produces a direct current voltage, positive at points 86 and negative at point 88 which is also proportional to the voltage $E_m$ to be monitored. Capacitor 90 reduces the ripple in the rectified direct current voltage. Also an adjustable resistor 92, connected in series with capacitor 90, controls the rate of charge and discharge of capacitor 90, thereby controlling the rate of response of the direct current voltage to changes in monitored A.C. voltage occurring between points 74 and 76. Resistors 94 and 96 of these additional monitoring circuit components are connected in series with the base monitoring circuit resistor 48, so that only a portion of the direct current voltage between points 86 and 88 appears across selective resistor 48. The remainder of the overall monitoring circuit comprising the primary or base monitoring circuit (A) functions exactly as described in reference to its use as illustrated in FIGURE 1. A monitored alternating voltage $E_m$ of the principal circuit upon reaching a level lower than a predetermined level will cause a signal lamp 28 to light.

For monitoring an alternating current $I_m$ flowing between points 98 and 100, the operation of the overall monitoring circuit is substantially similar to its operation just described. The only difference in components is in the additional monitoring circuit components wherein a current transformer 102 with its associated load resistor 104 is connected across the secondary at points 82 and 84, and used in lieu of the potential transformer 78.

Monitoring vehicle lighting circuits

The primary or basic monitoring circuit (A) illustrated in FIGURES 1 and 2 to be connected to various selected additional overall monitoring circuit components to monitor current or voltage respectively in both direct and alternating current principal circuits indicates the broad applicability of the monitoring circuits. When specific applications are considered wherein simultaneous voltage and/or current levels are to be monitored some modifications are necessarily involved within the primary or base monitoring circuit and also within its associated additional components which together comprise an overall monitoring circuit.

In FIGURE 3, the principal circuit is shown in complete detail as being composed of the entire lighting circuit or circuits of a vehicle such as an automobile including the vehicles high, 152, and low 158 beam multiple headlights and multiple taillights 164. To continuously monitor, preferably, the entire lighting circuits, the overall monitoring circuit necessarily is more complex yet its arrangement is based on the same underlying considerations previously discussed centering on the interrelationship of the detector and power transistors.

The operation of the circuit within the dotted line enclosure (A) of FIGURE 3 is quite similar to its operation discussed in reference to FIGURES 1 and 2. However, the detector transistor 20 in this vehicle light monitoring circuit supplies only approximately half of normal current through adjustable resistor 38, to which it is now connected through isolating diode 130. The other half of normal current through adjustable resistor 38 is supplied by detector transistor 120 through isolating diode 128. Transistor 20 monitors the headlight circuit and transistor 120 monitors the taillight circuit; the sum of their normal currents through collectors 24 and 124 causes sufficient voltage drop across adjustable resistor 38, and therefore raises potential of point 64 high enough, to keep transistor 30 from conducting, which keeps signal lamp 28 extinguished.

With respect to the principal circuits being monitored, headlight current flows from battery 50 to headlight switch 142, through wires 168 and 172, through shunt resistor 48, through wire 174, to headlight dimmer switch 146 shown in high beam position and out wire 150 to high beam lights 152, to vehicle ground point 154 and on through ground point 68, back to battery 50. This normal headlight current causes a voltage drop across the selective resistor 48. Also, a very small current flows on through the voltage divider network from point 58 through resistor 198, to point 59, through thermistor 40 and resistor 42, to point 60 and on through resistor 44, creating additional voltage drops between points 58 and 59 and between 59 and 60. The total of these three voltages gives bias voltage $E_{eb}$ for transistor 20.

Although, resistor 118 is in the circuit, it is not effective with respect to this bias voltage $E_{eb}$ during high beam light monitoring because it is approximately 100 times larger than resistor 198 with which it is in parallel connection including points 58 and 148 which are at the same potential. However, the resistor 118 has its purpose in compensating for the difference in principal circuit current flow on high beam light operation at approximately twelve amperes and on low beam light operation at approximately eight amperes in twelve volt vehicle systems.

With respect to low beam headlight operation, when the dimmer switch 146 is in its low beam position indicated by the dotted line in FIGURE 3, current flows through wire 174, through switch 146, through wire 156, through low beam filaments 158 and back to the battery through ground . This normal low beam headlight current causes a voltage drop across selective resistor 48. Because the principal circuit current is approximately the same as when one high beam light has failed, the signal lamp 28 would light as previously described in conjunction with high beam headlight monitoring, except for the operation of resistor 118. Whereas, for high beam operation, resistor 118 was connected in parallel with resistor 198 and therefor was not effective, being approximately 100 times larger than resistor 198, under low beam operation, resistor 198 becomes effective because point 148 is essentially at ground potential, being connected through wire 150 to the high beam filaments 152 which comprise a very low resistance path to ground. Consequently, more current now flows through resistor 198 and goes on through resistor 118 and thence to ground through high beam filaments 152, resulting in an additional voltage drop across resistor 198 in the voltage divider network consisting of resistors 198, 44, and 42, and thermistor 40. By properly choosing the sizes of resistors 198 and 118, the new voltage drop between points 58 and 59 will add to the voltage drop between points 58 and 60, and between points 56 and 58, so that the total voltage drop between points 56 and 60 is exactly the same for a normal low beam current of 8 amperes, as for a normal high beam current of 12 amperes when resistor 118 is in the circuit.

Failure of one or both low beam filaments 158 reduces the current through resistor 48 by approximately 50 percent, or to zero. The resulting reduction in voltage drop across selective resistor 48 reduces the bias voltage $E_{eb}$ between points 62 and 60 for detector transistor 20. This indirectly and promptly causes signal lamp 28 to light in the same manner as for failure of one or more high beam filaments with dimmer switch 146 in the high beam position.

Although operation of the signal lamp 28 has been described as resulting from failure of one or more headlight filaments, the lamp 28 will also operate when the headlight current being monitored is reduced even a small amount from normal by other causes such as a defective switch or a broken wire, or an abnormally low battery voltage.

Simultaneously upon the closing of headlight switch 142, taillight switch 144 is closed on almost all vehicles. Current then flows from vehicle battery 50, through wire 176, through shunt resistor 140, through wire 162 and to taillight filaments 164, thence to ground and back to battery 50, through the ground connection. This normal current causes a voltage drop across resistor 140 between points 178 and 180. At the same time current flows through voltage divider network consisting of resistor 134, adjustable resistor 138 and thermistor 132. This current flow in the network causes another voltage drop between points 180 and 136. The voltages developed between points 178 and 180 and between points 180 and 136 are additive, resulting in bias voltage $E_{eb}$ between points 62 and 136 which are connected to the emitter 122 and base 126 respectively of second detector transistor 120. The presence of the bias voltage $E_{eb}$ is recognized by noting that points 178 and 62 would be the same potential if resistor 46 were not included.

With the addition of this second detector transistor 120 and its associated components, failure of any taillight or headlight will turn on the signal light 28. This complete overall monitoring circuit includes base circuit A modified only by wire 196 being replaced by diode 130, wire 200 being replaced by resistors 198 and 118, and the addition of another detector transistor 120, diode 128, thermistor 132, resistors 140 and 134, and another adjustable resistor 138. Also the monitoring function of the taillight circuit can be omitted by removing diodes 128 and 130 and reconnecting wire 196, and by removing transistor 120, thermistor 132, resistors 140 and 134, and adjustable resistor 138.

The physical interconnection of this overall monitoring circuit or electronic relay assembly to vehicle circuits is illustrated in FIGURE 4 to include the schematic connections within the dotted line block (B) on FIGURE 3. An adapter plug 184 is inserted between headlight dimmer switch 146 and existing dimmer switch plug 186. Three prongs 188 on dimmer switch 146 fit into sockets 190 on adapter plug 184, as do prongs 192 on adapter plug 184 fit into sockets 194 on vehicle dimmer switch plug 186.

For purposes of further explanation of these vehicle monitoring circuits, the following resistor components were used in a typical twelve volt vehicle system: selective resistor 48=0.022 ohms—4$W$+5% shunt; decisive resistor 46=0.12 ohms ½$W$+10%; adjustable resistor 38=600 ohms, 1$W$; resistor 44=2400 ohms, ½$W$+10%; thermistor shunt resistor 42=43 ohms, ½$W$+10%; equalizing resistor 118=330 ohms, 1$W$+10%; and resistor 198=2.7 ohms, ½$W$+5%.

In the embodiments of the overall monitoring circuits illustrated in FIGURES 1, 2, and 3, the monitoring circuit was essentially arranged to monitor a change in the principal circuit which concerned a decrease in either current or voltage below a predetermined level. As illustrated in FIGURE 5, by inclusion of additional components and some rearrangement of the basic or primary monitoring circuit, another embodiment of a monitoring circuit is made available to indicate abnormal operation of a principal circuit wherein voltage or current varies both above and below predetermined levels.

In reference to the base or primary circuit (A) of FIGURES 1 and 2, a new power transistor 210 is added with its associated signal lamp 218 in FIGURE 5. This new lamp 218 operates when a principal circuit voltage or current between terminals 70 and 72 exceeds a predetermined level or set point and the other lamp 28 operates, as before, when a principal circuit voltage or current between 70 and 72 falls below a predetermined level or set point.

With respect to monitoring such voltage or current to determine whether a drop is occurring, operation of transistors 20 and 30 in this modified monitoring circuit is identical to their operation as described in reference to FIGURE 1. A lower than normal voltage between points 70 and 72 across selective resistor 48, below the set point, sequentially through operational changes of detector transistor 20 causes current to flow through power transistor 30 from its emitter 32 to its collector 34. In this modified monitoring circuit of FIGURE 5, however, the current flows from collector 34, also on through a potentiometer 204, and then through signal lamp 28, to point 68 and back through wire 54 to battery 50. The flow of current through this potentiometer 204 raises the potential of point 202 which can be adjusted as necessary, sufficiently close to the potential of point 208, so the small bias voltage $E_{eb}$ between points 208 and 202, which are connected to the emitter 212 and base 216, respectively, of output or power transistor 210, will not permit current to flow from the emitter 212 to the collector 214 and on to signal lamp 218. Thus a lower than normal voltage being monitored between points 70 and 72 and across selective resistor 48 will light signal lamp light 28, but prevent signal lamp 218 from lighting.

However, should the principal circuit voltage being monitored between points 70 and 72 across selective resistor 48 rise above normal, transistor 30 ceases to conduct and signal lamp 28 is not lighted. Also, since current no longer flows through potentiometer 204, the potential of point 202 is lowered with respect to point 208 and the bias voltage $E_{eb}$ is increased between the emitter 212 and base 216 of transistor 210, permitting transistor 210 to conduct. Thereafter current flows from battery 50 to point 208 to emitter 212 and out collector 214 to signal lamp 218 to point 206 and back to battery 50.

Thus a higher than normal voltage being monitored between points 70 and 72 and across resistor 48 will extinguish signal lamp 28 and will cause signal lamp 218 to light.

This overall monitoring circuit as illustrated in FIGURE 5, when properly connected to a principal circuit to be monitored by observation of its voltage or current levels, provides a monitoring circuit to precisely indicate when the predetermined level is maintained by having no warning signal lamps lighted even though at some other location a monitoring system "ready" light will be on. Thereafter the turning on of light 28 or light 218 will indicate respectively above and below predetermined level principal circuit operation.

Where the specified principal circuit operation is not required to be precisely at a designated level but instead the principal circuit operation can be within an operating range, then two monitoring circuits similar to the circuits illustrated in FIGURE 5 are utilized (not shown). They are calibrated at different levels, one at the top and the other at the bottom of the operating range. By the arrangement of two, three or four signal lights on a control panel the correct "within range" operation of the principal circuit can be monitored.

This operating range monitor circuit with the other monitoring circuits described, all indicates how the primary base monitoring circuit with modifications and/or additional circuit components including its multiple related installations establish overall monitoring circuits which reliably initiate visible, audible and remedial signals. The motorist's attention is directed to vehicle light failures by visible and/or audible signals preventing an accident. An operating engineer in a power plant distribution control room is directed to distribution faults by visible and/or audible signals. He can then operate standby systems associated with many critical constant electrical energy supply systems for operation while repairs and adjustments are undertaken in the main supply systems monitored by this invention.

The monitoring circuits, although illustrated as including PNP transistors are adaptable for like operation when NPN transistors are interchangeably used with connections reversed at the battery and elsewhere, as necessary. The reliable monitoring functions are still realized throughout the described embodiments when such interchange of transistors types is undertaken.

I claim:
1. A circuit for monitoring the magnitude of a first electric signal and producing an indication whenever the magnitude of said first electrical signal deviates beyond at least one predetermined limit, said circuit comprising a source of direct current potential, first and second transistors having their emitters connected in common to the positive side of said source through a first resistor and having the base of said first transistor and the collector of said second transistor connected in common to the negative side of said source through a second resistor, an indicator connected between the collector of said first transistor and the negative side of said source, means including said source normally biasing said second transistor to a predetermined conductive level such that its emitter to collector potential maintains said first transistor nonconductive, means for continuously applying to the emitter base circuit of said second transistor to a direct current signal proportional in magnitude to the magnitude of said first electrical signal in opposition to the potential applied to said second transistor emitter base circuit by said biasing means whereby, when said direct current signal reaches a predetermined magnitude, the emitter collector potential of said second transistor permits initiation of conduction by said first transistor and, upon initiation of conduction of said first transistor, the voltage drop induced thereby in said first resistor augments the effect of said applied direct current signal.

2. The circuit defined in claim 1 wherein said first electrical signal is a voltage signal.

3. The circuit defined in claim 2 wherein said first electrical signal is a current signal.

References Cited by the Examiner
UNITED STATES PATENTS

| | | | |
|---|---|---|---|
| 2,220,100 | 11/1940 | Hack | 315—82 |
| 2,828,450 | 3/1958 | Pinckaers. | |
| 2,922,148 | 1/1960 | Feldman et al. | 340—248 |
| 2,995,687 | 8/1961 | Mayberry. | |
| 2,995,712 | 8/1961 | Montgomery. | |
| 3,060,331 | 10/1962 | Habisohn | 328—58 |
| 3,106,645 | 8/1963 | Kaufman. | |
| 3,106,647 | 8/1963 | Dauko. | |
| 3,113,219 | 12/1963 | Gilmore. | |
| 3,117,253 | 1/1964 | Antoszewski. | |
| 3,166,678 | 1/1965 | Fleshman et al. | |
| 3,234,446 | 2/1966 | Molnar et al. | 330—19 X |

FOREIGN PATENTS 836,074    6/1960   Great Britain.

NEIL C. READ, *Primary Examiner.*

R. M. ANGUS, D. YUSKO, *Assistant Examiners.*